Sept. 4, 1962 A. NAUEN ETAL 3,052,448
DEVICE FOR CONNECTING THE ENDS OF CONVEYOR BELTS
Filed Dec. 29, 1958
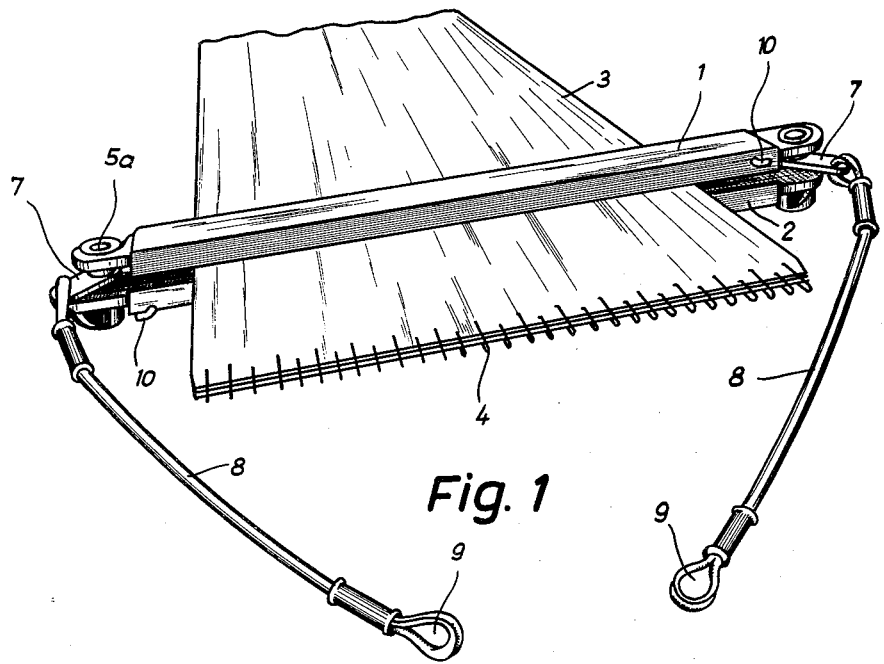
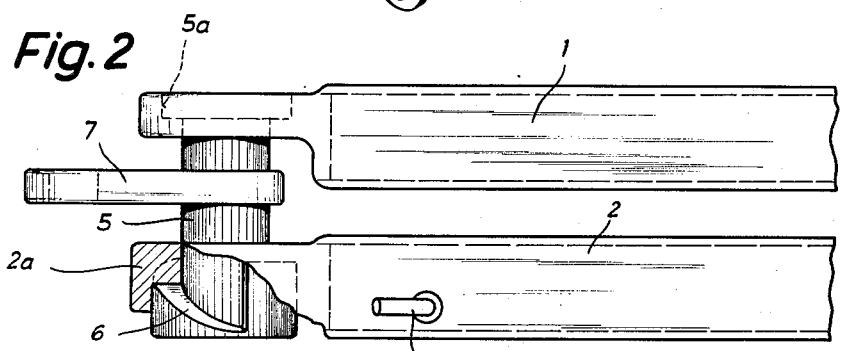
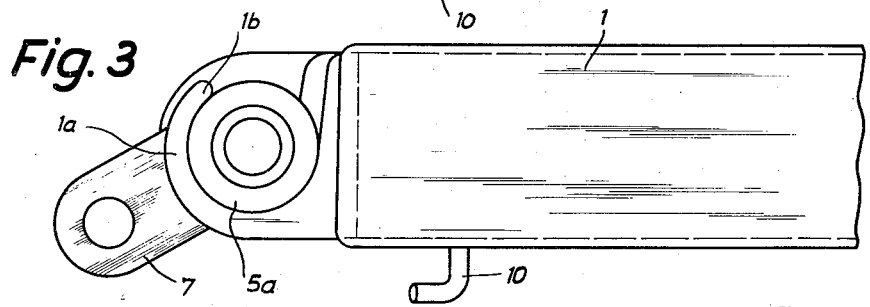
INVENTORS.
ALFRED NAUEN
HERBERT HALVERSCHEID
BY United States Patent Office 3,052,448
Patented Sept. 4, 1962

3,052,448
DEVICE FOR CONNECTING THE ENDS OF CONVEYOR BELTS
Alfred Nauen, Hilden, Rhineland, and Herbert Halverscheid, Dusseldorf, Germany, assignors to Hans Ziller, Millrath, uber Hochdahl, Germany
Filed Dec. 29, 1958, Ser. No. 783,292
Claims priority, application Germany Jan. 3, 1958
2 Claims. (Cl. 254—53)

The present invention relates to a device for connecting the ends of conveyor belts and, in particular, to a device for pulling together the ends of conveyor belts to be connected to each other.

Various devices are known for the above mentioned purpose, according to which clamping bars are employed which are placed upon the belt ends to be connected and by suitable pulling means are pulled toward each other in such a way that the eyes at the ends of a belt can be engaged by a connecting pin. Thus, devices have been suggested acording to which the pulling means are arranged at the upper as well as at the lower clamping rail or bar.

The heretofore known devices of the type involved have the drawback that either the employment thereof in actual practice is rather cumbersome, or the belt ends to be connected to each other are easily damaged. One of the heretofore known devices of the general type involved consists of four individual separate elements. The fact that the device consists of that many elements is very disadvantageous, particularly in connection with underground mining. If only one part of such a device gets lost, the entire device is useless. With devices equipped with self-locking clamping rails, a good clamping effect will be obtained, however, the loosening of the clamping means is frequently possible by rather heavy hammer blows only. The cross section of the belt at the clamping point is compressed to such an extent that damage to the rubber cover can hardly be avoided.

It is, therefore, an object of the present invention to provide a device for pulling together belt ends to be connected to each other, which will overcome the above mentioned drawbacks.

It is another object of this invention to provide a device of the type set forth in the preceding paragraph, which consists of one piece only and can be opened and closed in the manner of scissors.

These and other objects and advantages of the invention will appear more clearly from the following specification in connection with the accompanying drawings, in which:

FIG. 1 perspectively illustrates a clamping device according to the present invention.

FIG. 2 represents in side view and partly in section a portion of a clamping device according to the invention.

FIG. 3 is a top view of the clamping device of FIG. 2.

In conformity with the present invention, the ends of the clamping rails are equipped with screw-like cam means adapted to act perpendicular to the plane of the belt. The cam means are arranged in the mantle surface of rotatable bolts interconnecting said rails while the counter surfaces of said cam means are provided in the eyes of one of the two clamping rails. The connecting bolts are connected to the pulling means by short levers so that when exerting a pulling force upon the pulling means, the said bolts and thereby the cam surfaces will be turned. At one side, an eye of the rail may be hook-shaped so that the eye of said rail may tilt upon said bolt. Due to such an arrangement the entire device may consist of one piece and may be opened in the manner of scissors for grasping the conveyor belt, and may be closed for clamping purposes by tilting the upper clamping rail. The pulling means which may consist of cables or chains are in a manner known per se provided with a pulling device or a winch which is connected with the clamping means of the other belt end. In order to allow the clamping device to be transported quickly and safely by operating personnel, the rails may be provided with hooks for suspending the pulling means thereon so that the free eyes of the pulling means can be hung into said hooks for carrying the device.

Referring now to the drawings in detail, the clamping device shown therein comprises two rails 1 and 2 placed above and below an end 3 of a belt to be connected to another belt end. The said belt end is in a manner known per se provided with connecting hooks or eyes 4 to be engaged with corresponding hooks or eyes on the other belt end to be connected thereto. When said belt ends engage each other, a belt needle is passed through said eyes so as to hold the belt ends together. The belt ends are pulled toward each other by means of a pulling device.

With the arrangement according to the present invention, the two outwardly protruding ends of each of the rails 1 and 2 have mounted therein a bolt 5 which is connected to the upper rail 1 by means of a head 5a. The lower end of bolt 5 is provided with a cam 6 comprising a helical or screw-shaped radial surface. The said screw-shaped cam portion extends into an eye 2a of the lower rail as is clearly shown in FIG. 2. The recess of eye 2a corresponds to the cam portion 6.

In order to allow a simple mounting of the rails, eye 1a at one end of the upper rail is designed hook-shaped with an opening 1b so that for purposes of closing the device, the rail may be moved below head 5a of the bolt. Each bolt 5 is provided with a short lever 7 to which a pulling means for instance a cable 8 may be attached. The end of the cable is provided with an eye 9 to be connected with a pulling member.

When the two rails 1 and 2 are placed above and below the belt 3, and when the upper rail 1 has been placed upon bolt 5, it will be evident that actuation of the pulling member through cable 8 will cause levers 7 to turn toward each other and thereby through cam portions 6, rail 2 will in the direction of bolt 5 be displaced toward rail 1 whereby the belt end 3 will be clamped in or between the rails 1 and 2. In order to facilitate the carrying of the clamping device, the rails may be provided with hooks 10 in which the eyes 9 of cable 8 may be suspended so that the entire clamping device may easily be suspended over the shoulders of the operator.

The invention is, by no means, limited to the particular embodiment described above but may also comprise any modifications within the scope of the appended claims.

For instance, the cams may also be provided on both ends of the bolt so that closed eyes of bolt clamping rails will in this particular instance form guiding means and at the same time will move the rails toward each other. Furthermore, the cam parts may also be replaced by a multi-pitch spindle and may make the clamping feature of the device more or less quickly effective.

What we claim is:
1. A clamping device for either end portion of a conveyor belt the ends of which have to be pulled together, which comprises in combination: a first clamping rail, a second clamping rail, said rails being arranged one above the other for receiving therebetween and transverse thereto a belt portion having a width less than the length of said rails so that the ends of said rails will laterally protrude beyond the sides of the belt portion to be received therebetween, two clamping bolts respectively extending through the ends of said rails and engaging the same, at least one of the end portions of each of said bolts having a cam with an inclined helical surface portion of a relatively high pitch engaging a correspondingly contoured surface in the respective adjacent rail, and two single levers having one of their ends respectively connected to said bolts for selectively turning said bolts in tightening direction to pull said rails toward each other.

2. A clamping device for either end portion of a conveyor belt the ends of which have to be pulled together, which comprises in combination: a first clamping rail, a second clamping rail, said rails being arranged one above the other for receiving therebetween and transverse thereto a belt portion having a width less than the length of said rails so that the ends of said rails will laterally protrude beyond the sides of the belt portion to be received therebetween, two clamping bolts respectively extending through the ends of said rails and engaging the same, at least one of the end portions of each of said bolts having a cam with an inclined helical surface portion of a relatively high pitch engaging a correspondingly contoured surface in the respective adjacent rail, two single levers having one of their ends respectively connected to said bolts for selectively turning said bolts in tightening direction to pull said rails toward each other, and cable means having one end thereof respectively connected to the other ends of said levers.

References Cited in the file of this patent

UNITED STATES PATENTS

| | | |
|---|---|---|
| 336,571 | Lawrence | Feb. 23, 1886 |
| 836,918 | Bucy | Nov. 27, 1906 |
| 1,100,931 | Wainwright et al. | June 23, 1914 |
| 1,911,071 | Duncan | May 23, 1933 |